United States Patent
Sung

(10) Patent No.: US 10,754,009 B2
(45) Date of Patent: Aug. 25, 2020

(54) LIDAR APPARATUS

(71) Applicant: Lite-On Technology Corporation, Taipei (TW)

(72) Inventor: Bing-Han Sung, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 382 days.

(21) Appl. No.: 15/800,063

(22) Filed: Oct. 31, 2017

(65) Prior Publication Data

US 2019/0086515 A1     Mar. 21, 2019

(30) Foreign Application Priority Data

Sep. 21, 2017   (TW) .............................. 106132362 A

(51) Int. Cl.
| | |
|---|---|
| G01C 3/08 | (2006.01) |
| G01S 7/481 | (2006.01) |
| H02J 7/02 | (2016.01) |
| G01S 17/08 | (2006.01) |
| G01S 17/42 | (2006.01) |
| H02J 50/10 | (2016.01) |

(52) U.S. Cl.
CPC ............ *G01S 7/4811* (2013.01); *G01S 7/4817* (2013.01); *G01S 17/08* (2013.01); *G01S 17/42* (2013.01); *H02J 7/025* (2013.01); *H02J 50/10* (2016.02)

(58) Field of Classification Search
CPC ........ G01S 17/08; G01S 17/42; G01S 7/4817; G01S 7/4811; H02J 7/025; H02J 50/10
USPC ....................................................... 356/5.01
See application file for complete search history.

(56) References Cited

U.S. PATENT DOCUMENTS

| | | | |
|---|---|---|---|
| 6,452,668 B1 * | 9/2002 | Pratt ..................... | G01C 15/002 356/141.4 |
| 7,187,823 B2 * | 3/2007 | Dimsdale ............. | G01C 15/002 385/134 |
| 9,425,654 B2 * | 8/2016 | Lenius ................... | H02J 50/10 |

* cited by examiner

*Primary Examiner* — Mark Hellner
(74) *Attorney, Agent, or Firm* — JCIPRNET

(57) ABSTRACT

A lidar apparatus including a laser transceiver assembly, a wireless charging assembly and a driving assembly is provided. The wireless charging assembly is coupled to the laser transceiver assembly. The wireless charging assembly is configured to provide a charge power to the laser transceiver assembly. The driving assembly is configured to drive the laser transceiver assembly to rotate. The wireless charging assembly and the driving assembly are respectively located at two opposite sides of the laser transceiver assembly.

7 Claims, 1 Drawing Sheet

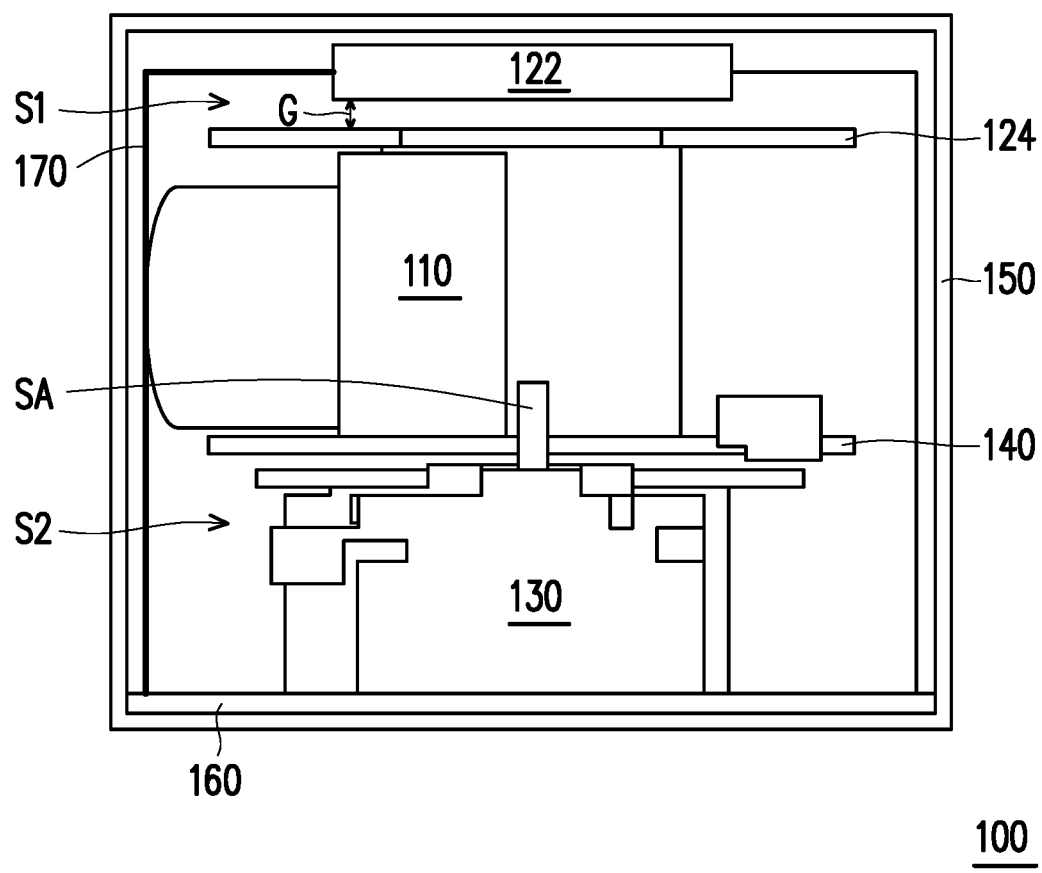

LIDAR APPARATUS

CROSS REFERENCE TO RELATED APPLICATION

This application claims the priority benefit of Taiwan application serial no. 106132362, filed on Sep. 21, 2017. The entirety of the above-mentioned patent application is hereby incorporated by reference herein and made a part of specification.

BACKGROUND OF THE INVENTION

1. Field of the Invention

The invention relates to a lidar apparatus, and particularly relates to a lidar apparatus having a wireless charging assembly.

2. Description of Related Art

Lidar apparatuses have been used more and more broadly on the market. For example, in the technical fields of cleaning robots and driverless vehicles, the lidar apparatuses with the characteristic of high accuracy are employed to scan the surroundings and thus able to avoid obstacles and plan paths.

The conventional lidar apparatus requires a 360-degree view angle to scan the surroundings. To achieve a high resolution and the 360-degree view angle, circuits and mechanical structures in the conventional lidar apparatus are quite complicated. Besides, the manufacturing of the conventional lidar apparatus is also very complicated and consumes a great amount of manpower. In general, charging of a laser assembly in the lidar apparatus is achieved through a conductive slip ring. However, the slip ring may be worn and thus affect the life span and reliability of the product. In order to reduce wearing and reinforce durability, some adopt conductive slip rings including mercury or noble metals. Nevertheless, environmental friendliness and cost then become issues.

SUMMARY OF THE INVENTION

The invention provides a lidar apparatus having a simpler structure and being easier to manufacture.

A lidar apparatus according to an embodiment of the invention includes a laser transceiver assembly, a wireless charging assembly, and a driving assembly. The wireless charging assembly is coupled to the laser transceiver assembly. The wireless charging assembly is configured to provide a charge power to the laser transceiver assembly. The driving assembly is configured to drive the laser transceiver assembly to rotate. The wireless charging assembly and the driving assembly are respectively located at two opposite sides of the laser transceiver assembly.

According to an embodiment of the invention, the driving assembly further includes a rotary shaft. The lidar apparatus further includes a rotary disc, a control circuit, and a case. The rotary disc is configured to mount the laser transceiver assembly. The rotary shaft of the driving assembly penetrates the rotary disc, and the driving assembly drives the laser transceiver assembly to rotate through the rotary shaft and the rotary disc. The control circuit is coupled to the wireless charging assembly and the laser transceiver assembly. The laser transceiver assembly, the wireless charging assembly, the driving assembly, the rotary disc, and the control circuit are disposed in the case.

According to an embodiment of the invention, the wireless charging assembly further includes a power emission assembly and a power transmission assembly. The power emission assembly is fixed to the case and configured to transmit the charge power. The power transmission assembly is fixed to the laser transceiver assembly. The power transmission assembly is coupled to the power emission assembly and the laser transceiver assembly, and is configured to receive the charge power to transmit the charge power to the laser transceiver assembly.

According to an embodiment of the invention, a fixed gap is provided between the power emission assembly and the power transmission assembly.

According to an embodiment of the invention, the lidar apparatus further includes a conductive wire. The control circuit is coupled to the wireless charging assembly and the laser transceiver assembly through the conductive wire.

According to an embodiment of the invention, the conductive wire extends from the wireless charging assembly to the control circuit along an inner side of the case and bypasses the control circuit.

According to an embodiment of the invention, the laser transceiver assembly includes a laser transmitting end and a laser receiving end. The laser transmitting end is configured to emit a first laser beam toward at least one target. A second laser beam is formed after the first laser beam is reflected by the at least one target. The laser receiving end is configured to receive the second laser beam. The laser transceiver assembly generates a distance measuring signal based on a difference between the first laser beam and the second laser beam. The control circuit is configured to receive the distance measuring signal from the laser transceiver assembly, and the control circuit computes a distance between the lidar apparatus and the at least one target.

According to an embodiment of the invention, the driving assembly includes a motor.

Based on the above, since the lidar apparatus according to the embodiments of the invention is charged by providing the charge power to the laser transceiver assembly through the wireless charging assembly without the need to charge through a conductive slip ring, a complicated manufacturing process is avoided. Thus, the lidar apparatus according to the embodiments of the invention has a simpler structure and is easier to manufacture.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic cross-sectional view illustrating a lidar apparatus according to an embodiment of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic cross-sectional view illustrating a lidar apparatus according to an embodiment of the invention.

Referring to FIG. 1, in the embodiment, a lidar apparatus 100 includes a laser transceiver assembly 110, a wireless charging assembly 120, and a driving assembly 130. The wireless charging assembly 120 is coupled to the laser transceiver assembly 110, and is configured to provide a charge power to the laser transceiver assembly 110 to provide the power required by the laser transceiver assembly 110. The driving assembly 130 is configured to drive the laser transceiver assembly 110 to rotate. The wireless charging assembly 120 and the driving assembly 130 are respectively located at two opposite sides S1 and S2 of the laser transceiver assembly 110. In the embodiment, the wireless charging assembly 120 is located at the upper side S1 of the laser transceiver assembly 110, and the driving assembly 130 is located at the lower side S2 of the laser transceiver assembly 110. In the embodiment, a motor having a structure of direct drive mechanism, for example, is implemented as the driving assembly 130.

In the embodiment, the driving assembly 130 includes a rotary shaft SA. The lidar apparatus 100 further includes a rotary disc 140, a case 150, and a control circuit 160. The rotary disc 140 is configured to mount the laser transceiver assembly 110. The rotary shaft SA of the driving assembly 130 penetrates the rotary disc 140. Specifically, the center of the rotary disc 140 has an assembling hole (not shown), and the rotary shaft SA penetrates the rotary disc through the assembling hole of the rotary disc 140. The driving assembly 130 drives the laser transceiver assembly 110 to rotate through the rotary disc 140 and the rotary shaft SA. The control circuit 160 is coupled to the wireless charging assembly 120 and the laser transceiver assembly 110 through a conductive wire 170. The conductive wire 170 extends from the wireless charging assembly 120 to the control circuit 160 below the driving assembly 130 along an inner side of the case 150 and bypasses the driving assembly 130. The laser transceiver assembly 110, the wireless charging assembly 120, the driving assembly 130, the rotary disc 140, and the control circuit 160 are disposed in the case 150. The case 150 offers protection.

In the embodiment, the wireless charging assembly 120 includes a power emission assembly 122 (i.e., an emitting end) and a power transmission assembly 124 (i.e., a receiving end). The power emission assembly 122 includes a first coil (not shown). The power transmission assembly 124 includes a second coil (not shown) and a third coil (not shown). The first coil is coupled to the second coil, so that the power transmission assembly 124 may receive the charge power from the power emission assembly 122. The third coil is coupled to the laser transceiver assembly 110 to transmit the charge power from the power emission assembly 122 to the laser transceiver assembly 110 and provide the power required by the laser transceiver assembly 110. Besides, in the embodiment, the power emission assembly 122 is fixed to the case 150, and the power transmission assembly 124 is fixed to the laser transceiver assembly 110. With the configuration, a fixed gap G is provided between the power emission assembly 122 and the power transmission assembly 124, and therefore the power emission assembly 122 is able to stably transmit power to the power transmission assembly 124.

In the embodiment, the laser transceiver assembly 110 includes a laser transmitting end (not shown) and a laser receiving end (not shown). The laser transmitting end is configured to emit a first laser beam (not shown) toward at least one target in an external environment. A second laser beam (not shown) is formed after the first laser beam is reflected by the at least one target. The laser receiving end is configured to receive the second laser beam. The laser transceiver assembly 110 generates a distance measuring signal based on a difference between the first laser beam and the second laser beam. The difference between the first laser beam and the second laser beam is a time difference, for example. The distance measuring signal is transmitted to the control circuit 160 through wiring of the conductive wire 170. The control circuit 160 computes a distance between the lidar apparatus 100 and the at least one target in the external environment based on the distance measuring signal.

It should be noted that, since the distance measuring signal is transmitted to the control circuit 160 through the wiring of the conductive wire 170 (i.e., the conductive wire 170 bypasses the driving assembly 130 and extends to the control circuit 160 below the driving assembly 130) in the lidar apparatus 100 of the embodiment, the driving assembly 130 of the embodiment may adopt the direct drive motor mechanism that is simpler without the needs of adopting a more expensive hollow motor structure where the conductive wire 170 passes through the hollow motor structure and extends to the control circuit 160.

Since the lidar apparatus 100 of the embodiment is charged by providing the charge power to the laser transceiver assembly 110 through the wireless charging assembly 120 without the need to charge through a conductive slip ring, a complicated manufacturing process is avoided. Thus, the lidar apparatus 100 of the embodiment has a simpler structure and is easier to manufacture. Besides, the lidar apparatus 100 of the embodiment also avoids wearing of the slip ring in the conventional art. Therefore, the lidar apparatus 100 of the embodiment is reliable and has a longer lifespan.

Besides, the wireless charging assembly 120 and the driving assembly 130 of the lidar apparatus 100 of the embodiment are respectively disposed at the two opposite sides S1 and S2 of the laser transceiver assembly 110. As it may be more difficult to manufacture if the wireless charging assembly 120 and the driving assembly 130 are disposed at the same side of the laser transceiver assembly 110, the lidar apparatus 100 of the embodiment thus has a simpler structure and is easier to manufacture given the aforementioned configuration.

In view of the foregoing, since the laser transceiver assembly is charged through the wireless charging assembly in the lidar apparatus according to the embodiments of the invention, the more complicated conductive slip ring is not required. Therefore, the lidar apparatus according to the embodiments of the invention has a simpler structure and is easier to manufacture. Moreover, the driving assembly and the wireless charging assembly in the lidar apparatus are respectively located at opposite two sides of the laser transceiver assembly. Hence, with the configuration, a more complicated structure is avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lidar apparatus, comprising:
   a laser transceiver assembly;
   a wireless charging assembly, coupled to the laser transceiver assembly and configured to provide a charge power to the laser transceiver assembly;
   a driving assembly, configured to drive the laser transceiver assembly to rotate, the driving assembly further comprises a rotary shaft;
   a rotary disc, configured to mount the laser transceiver assembly, wherein the rotary shaft of the driving assembly penetrates the rotary disc, and the driving assembly drives the laser transceiver assembly to rotate through the rotary shaft and the rotary disc;
   a control circuit, coupled to the wireless charging assembly and the laser transceiver assembly; and
   a case, wherein the laser transceiver assembly, the wireless charging assembly, the driving assembly, the rotary disc, and the control circuit are disposed in the case,
   wherein the wireless charging assembly and the driving assembly are respectively located at two opposite sides of the laser transceiver assembly.

2. The lidar apparatus as claimed in claim 1, wherein the wireless charging assembly further comprises:
   a power emission assembly, fixed to the case and configured to transmit the charge power; and
   a power transmission assembly, fixed to the laser transceiver assembly, coupled to the power emission assembly and the laser transceiver assembly, and configured to receive the charge power to transmit the charge power to the laser transceiver assembly.

3. The lidar apparatus as claimed in claim 2, wherein a fixed gap is provided between the power emission assembly and the power transmission assembly.

4. The lidar apparatus as claimed in claim 1, further comprises a conductive wire, wherein the control circuit is coupled to the wireless charging assembly and the laser transceiver assembly through the conductive wire.

5. The lidar apparatus as claimed in claim 4, wherein the conductive wire extends from the wireless charging assembly to the control circuit along an inner side of the case and bypasses the control circuit.

6. The lidar apparatus as claimed in claim 1, wherein the laser transceiver assembly comprises a laser transmitting end and a laser receiving end, the laser transmitting end is configured to emit a first laser beam toward at least one target, a second laser beam is formed after the first laser beam is reflected by the at least one target, and the laser receiving end is configured to receive the second laser beam, wherein the laser transceiver assembly generates a distance measuring signal based on a difference between the first laser beam and the second laser beam, the control circuit is configured to receive the distance measuring signal from the laser transceiver assembly, and the control circuit computes a distance between the lidar apparatus and the at least one target.

7. The lidar apparatus as claimed in claim 1, wherein the driving assembly comprises a motor.

* * * * *